Figure 1:
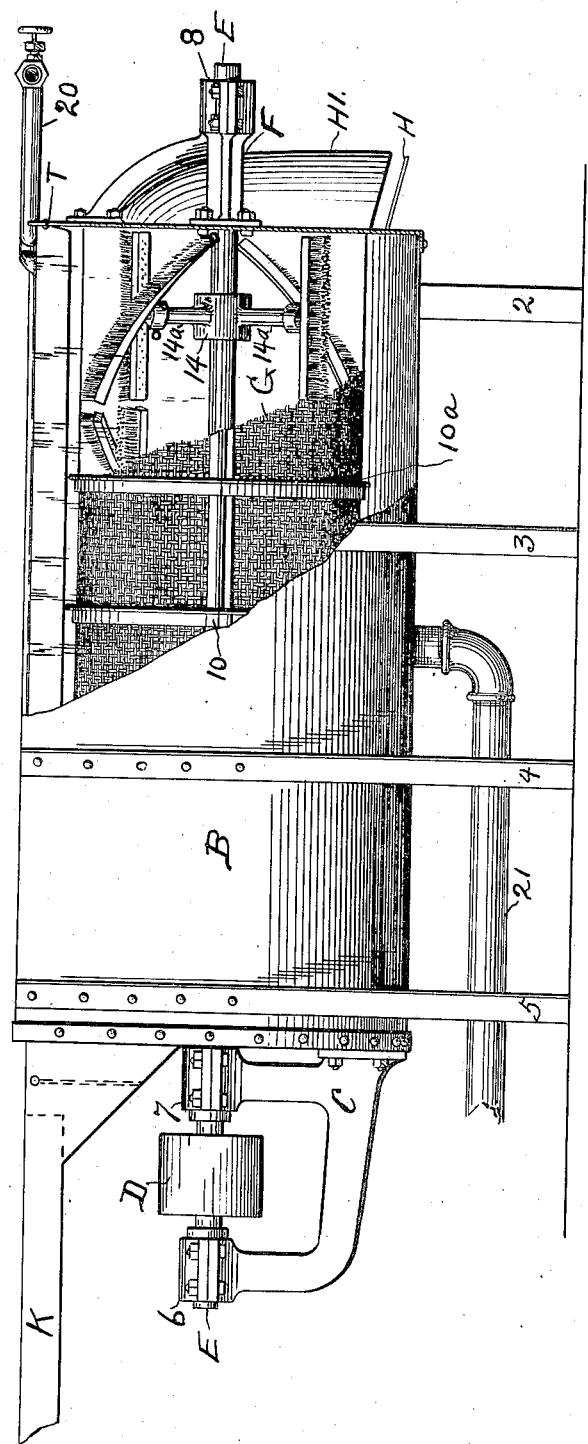

H. A. BEEKHUIS.
DEVICE FOR CLEANSING AND REMOVING THE SKINS FROM DRIED FRUITS, SUCH AS PEACHES, APRICOTS, &c.
APPLICATION FILED DEC. 12, 1918.

1,312,381.

Patented Aug. 5, 1919.
2 SHEETS—SHEET 1.

INVENTOR
Hermanus A Beekhuis
BY
Francis C Huebner
ATTORNEY

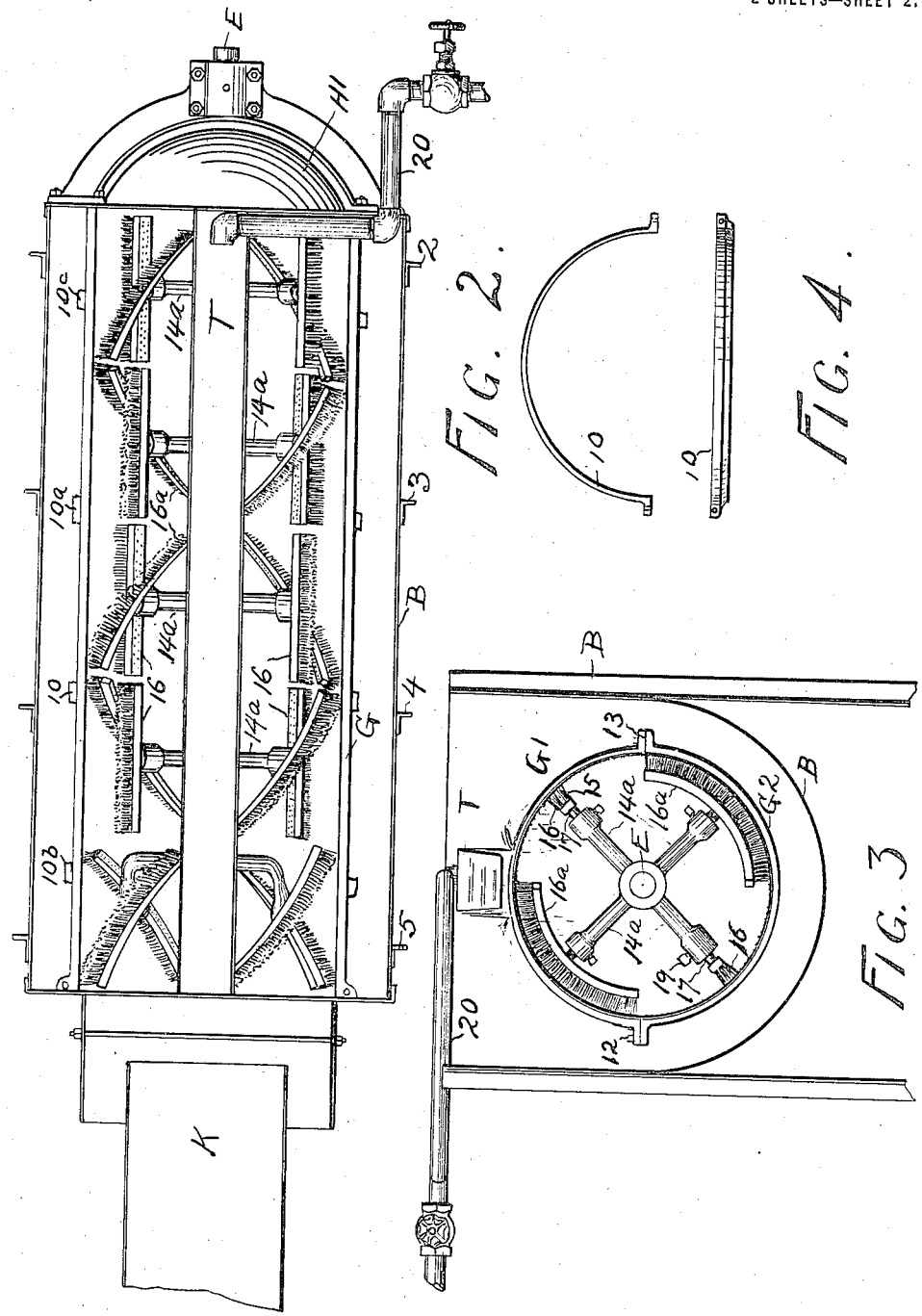

UNITED STATES PATENT OFFICE.

HERMANUS A. BEEKHUIS, OF FRESNO, CALIFORNIA, ASSIGNOR TO CALIFORNIA PEACH GROWERS (INC.), OF FRESNO, CALIFORNIA.

DEVICE FOR CLEANSING AND REMOVING THE SKINS FROM DRIED FRUITS, SUCH AS PEACHES, APRICOTS, &c.

1,312,381.          Specification of Letters Patent.          Patented Aug. 5, 1919.

Application filed December 12, 1918. Serial No. 266,473.

*To all whom it may concern:*

Be it known that I, HERMANUS ALBERT BEEKHUIS, a citizen of the United States, and a resident of the city of Fresno, in the county of Fresno and State of California, have invented a new and useful Improvement in Devices for Cleansing and Removing the Skins from Dried Fruits, Such as Peaches, Apricots, and Similar Fruits, of which the following is a specification.

My invention relates to an apparatus for cleansing dried fruits, such as peaches, apricots and nectarines, and more especially for removing the skins therefrom after the skins have been loosened. In connection with the invention herein and hereinafter described I have heretofore invented and received Letters Patent No. 1,246,223 under date of November 13, 1917, on a process for loosening and removing the skins from dried fruits, such as peaches and apricots, which consists substantially of drying the fruit, then immersing it in a heated solution consisting approximately of one part of bicarbonate of soda and fifty parts of water, and then subjecting the fruit to a centrifugal motion while being brushed and washed. In the invention for which I am now asking for a patent the arrangement and character of the brushes hereinafter described are more effective for the object desired than those heretofore in use. Instead of spraying the water upon the fruit it is gently dropped thereon, this step in the process having been discovered as more effective for removing the skins, and the cylinder of the machine is constructed in two parts so that it can be readily taken apart and cleaned. Other objects of said invention will hereinafter appear.

In the drawings accompanying this specification Figure 1 is a side view of the machine complete with parts cut away to show portions of the wire mesh cylinder, the main shaft and the brushes thereon. Fig. 2 is a top plane of the device showing the cylinder in section, and showing in detail the arrangement of the brushes on the main shaft. Fig. 3 is an end view of the device. Fig. 4 is a detail view of the stiffening elements for strengthening the cylinder.

In said drawings B is an outside shell or container which is supported by a plurality of legs 2, 3, 4 and 5. Attached to shell B is a bracket C which supports bearings 6 and 7. D is the driving pulley. At the opposite end of shell B is a support F carrying a bearing 8 which is alined with bearings 6 and 7. The bearings 6, 7 and 8 carry a main shaft E, which extends through the approximate center of shell B. Within the shell B, and concentric with main shaft E is a wire mesh cylinder G which extends the approximate length of the shell B. 10, $10^a$, $10^b$ and $10^c$ are a plurality of rings extending around the wire mesh cylinder and used for the purpose of strengthening and stiffening the cylinder. For convenience in cleaning the cylinder I have formed cylinder G in two parts indicated in Fig. 3 as $G^1$ and $G^2$. The rings 10, $10^a$, $10^b$ and $10^c$ are cut in halves, these rings being attached to the halves of cylinder B and flanges formed on the ends thereof. By bolting the flanges together by bolts 12 and 13 the halves of the cylinder are rigidly attached together. I have attached a plurality of brushes to shaft E as follows: 14 is a hub attached to shaft 8, said hub having a plurality of spokes $14^a$. At the end of each spoke a brush is attached. In my invention I place one half of the brushes 16 parallel with the shaft E and half of the brushes $16^a$ are placed obliquely to the shaft E. The brushes 16 and $16^a$ should alternate, the object being that the brush 16 will brush the fruit, and the oblique brushes $16^a$ will give it a slightly forward motion. The spokes 14 are constructed hollow. 17 is a handle attached to the brushes 16 and $16^a$ of such size that it fits in the hole in the end of spoke 15 thus permitting the brush to be adjusted laterally. 19 is a set screw used for fastening the brushes 16 and $16^a$ to the spokes 14.

T is a trough for holding water placed parallel with and directly over the shaft E. 20 is a pipe for conducting water to trough T. In operating this device the water flows into the trough until it overflows, and runs into the cylinder. 21 is a drain pipe for carrying off the water and washings from the shell B. K is a hopper for leading the fruit into the cylinder, and H is a spout at the opposite end of the cylinder C for discharging the fruit. $H^1$ is a shield for directing the flow of the fruit to spout H. In operating this machine the dried peaches are first treated to a hot solution of water and bicarbonate of soda, then passed through lead K into the cylinder G. The shaft E is rapidly rotated, and water is dripped upon the peaches from trough F. The brushes 16 and 16ª brush the fruit, give it a centrifugal motion roll, and move it slowly to the end of the cylinder opposite the end where the fruit is introduced into the cylinder. The skins on the fruit being partially loosened by the bicarbonate of soda bath are brushed off and removed and the fruit cleansed by the washing, brushing, and centrifugal motion imparted to the fruit by the machine above described. The bristles of the brush should be semi-soft as a metal bristle would be too harsh on the fruit. The bristles on the brush are preferably arranged on an elongated base. The cylinder G is open mesh or perforated to permit the water and washings to pass through.

I claim as new and ask for Letters Patent—

1. In a device for cleansing peaches the skins of which have been partially loosened, the combination of an outer shell, a perforated cylinder within the shell, a shaft within the cylinder having a common center line with the cylinder and adapted to rotate, a plurality of brushes attached to arms extending radially from the shaft, said brushes being arranged so each alternate brush extends parallel with the shaft and the other brushes are obliquely thereto, substantially as described.

2. In a device for cleansing and peeling dried fruits such as peaches, the skins of which have previously been partially loosened, the combination of a perforated cylinder, a shaft having a common center line arranged to rotate within the cylinder, and brushes being constructed on an elongated base, and with bristles of the character of hair, each alternate brush being parallel with the shaft, and the others oblique thereto.

3. In a device for cleansing and peeling dried fruits, such as peaches, the skins of which has been partially loosened, the combination of a wire mesh cylinder, means for introducing fruit into the cylinder and discharging it therefrom, a shaft within the cylinder having a common center line therewith, a plurality of brushes attached to the shaft and rotatable therewith, some of said brushes being approximately a parallelogram in shape and arranged approximately parallel with the shaft, and other of said brushes being arranged at an angle with the shaft, and shaped so the face of the brush will approximately conform to the inside wall of the cylinder.

4. In a device for cleansing and peeling dried fruits, such as peaches, the skins of which have been partially loosened, the combination of a perforated cylinder, a shaft therein having a common center line therewith, means for rotating the shaft, brushes attached to the shaft so that the faces of the brushes pass near to the inside wall of the cylinder but do not touch it, a water receptacle open at the top placed above the cylinder, means for pouring water into the receptacle so that it will overflow, and means for introducing the fruit into the cylinder, substantially as described.

HERMANUS A. BEEKHUIS.

Witnesses:
CLEO K. CURTIS,
ANNA A. HUEBNER.